United States Patent Office 3,323,979
Patented June 6, 1967

3,323,979
METHOD OF IMPROVING THE DRAINAGE RATE IN FORMING PAPER BY INCORPORATING A REACTION PRODUCT OF POLYACRYLAMIDE, FORMALDEHYDE AND DIALKYLAMINE IN THE FURNISH
William A. Foster, Mapleton, and Joyce E. Stout, Midland, Mich., assignors to The Dow Chemical Company, Midland, Mich., a corporation of Delaware
No Drawing. Filed Sept. 24, 1964, Ser. No. 399,088
3 Claims. (Cl. 162—167)

The present invention relates to a novel and improved process for the manufacture of paper. More particularly the invention concerns technology for improving the rate at which paper can be formed from certain fiber suspensions.

In recent years, organic polyelectrolytes have been finding an ever increasing number of uses in the manufacture of paper. Among such uses are filler retention, strength property modification, e.g., wet or dry strengths, and internal sizing. Usually the polyelectrolytes have been used to modify an end property in the finished paper as by applying the polyelectrolytes to the finished paper or by incorporating them into the fiber furnish for the paper.

When the latter technique is employed, an additional advantage is occasionally observed to accrue to the paper making process. This advantage is an increased drainage rate, which permits more rapid dewatering of the fiber furnish and thus more paper from a given machine per unit of time. Among the polyelectrolytes which produce this result are the polyvinylbenzyl sulfonium halides, polyamides obtained as condensation products of polybasic acids, amines and epichlorohydrin, see for example U.S. Patent 2,926,154, polyaminoalkyl acrylates, inclusive of copolymers thereof and cationic starches such as may be obtained by the reacting amines with modified starches. One of the better drainage aids, and in fact the best known to applicant, is polyethyleneimine.

One fault with polyethyleneimine, which also applies to the other drainage aids, is that its activity depreciates significantly with increases in the acidity of the fiber furnish below about pH 7. This loss in activity is further aggravated by its sensitivity to the presence of sulfate ions, which are present in many fiber furnishes as a result of the use of alum in the paper making process and the recycling of white water.

It has now been discovered that drainage rates as great as 160 percent of those possible with polyethyleneimine are achieved according to the paper making process hereinafter described. Particularly, superior drainage is achieved with fiber furnishes at less than pH 7 and optionally in the presence of large amounts of sulfate groups, e.g., greater than about 200 parts per million by weight of the fiber furnish, in accordance with the discovery of the invention.

In a process for the manufacture of paper which comprises wet laying an acidic fiber furnish to form paper, the invention involves the improvement which consists in incorporating into the furnish from about 0.01 percent up to about 0.3 percent by weight, preferably 0.025 percent up to 0.15 percent by weight, based on the fiber content of the furnish, of a water soluble, essentially linear polymer in which at least about 5 mole percent of the combined mers correspond to a monomer unit having the general formula

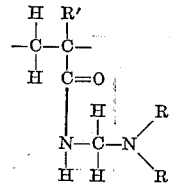

wherein R is an alkyl group having from 1 to 2 carbons and R' is hydrogen or $CH_3$. The two unsatisfied valences indicate the position of integration into the polymer chain. In effect such polymers correspond to vinyl polymerization products of monoethylenically unsaturated monomers of which at least about 5 mole percent is the monoethylenically unsaturated precursor to the afore-described monomer unit and the remainder monoethylenically unsaturated monomers copolymerizable therewith. In such copolymers at least about 50 mole percent of the monomers should be hydrophilic to insure water solubility in the finished copolymer.

A convenient method of preparing such polymers is to first prepare a water soluble polymer containing at least about 5 mole percent of a monomer having substituent carboxamide groups. This polymer is dissolved in water and, in such form, reacted with formaledhyde and a suitable dialkylamine according to the method described in U.S. Patent 2,328,901 and also by Schiller and Suen in "Ionic Derivatives of Polyacrylamide," Ind. Eng. Chem. 49, 2132 (1956).

The terminology "higher molecular weight" as applied to the polymer additive employed in the process of the invention refers to polymers having molecular weights above about 1 million. For purposes herein, such minimum molecular weight is defined as corresponding to a water solution viscosity, in which 0.5 percent by weight of the polymer is dissolved, of at least about 12 centipoises as measured at pH 11 with an Ostwald viscosimeter at 25° C.

Although the above-described polymers are depicted in a free-base form, it should be understood that the acid salts of such polymers can be also added to the fiber furnish. In fact, in as much as the process of the invention is carried out at an acidic pH, these acid salts are likely to form in situ depending upon the nature of the acidifying components of the fiber furnish. Suitable salt forms of the aforementioned polymer include for example the reaction products thereof with hydrochloric, hydrobromic, sulfuric, nitric, phosphoric, acetic, and chloroacetic acids.

In carrying out the invention, an aqueous stock solution of the polymer is mixed with sufficient water to prepare a dilute solution, e.g., such solutions usually contain from as little as 0.01 percent up to as much as 5 percent or more by weight polymer solids. Generally, the dilute solution of the polymer is added with suitable mixing to the fiber furnish at any point prior to formation of the paper web. While it may be added prior to completion of the beating or other refining steps, it is preferred to incorporate the polymer into a turbulent stream of the furnish after the latter two operations. The pH of the fiber furnish is immaterial to general operability of the described polymer as a drainage aid, but within the range from about pH 4 up to about pH 7, it is uniquely superior to the best known drainage aids.

In a preferred mode of operation, the polymer solution is introduced at the inlet side of the fan pump on a conventional paper sheeting machine, such as a Fourdrinier machine. Alternatively, the copolymer solution may be mixed with the fiber furnish as it enters the headbox, provided there is sufficient agitation in the headbox assembly to provide for thorough mixing of the polymer with the pulp prior to formation of the paper web. A sufficient amount of the polymer solution is employed to provide from about 0.01 to about 0.3 percent, preferably from about 0.025 to about 0.15 percent, by weight of the polymer, based on the weight of cellulosic fiber in the pulp suspension.

The fiber furnish treated under the invention may contain added alum in amounts up to 100 pounds per ton of cellulose fibers which, together with sulfate ion the recycled white water, provides a total sulfate concentration in excess of 200 parts per million parts by weight of the total fiber furnish. Under such conditions of usage, the polymer of the invention is especially superior.

Following the addition of the polymer, the treated fiber furnish can be employed for the preparation of paper in any conventional fashion such as in a Fourdrinier machine or conventional cylinder machine. The paper web so formed may be pressed and dried in any convenient fashion.

In still further experiments, the Canadian Standard Freeness Test results were obtained using the above described polymers in admixture with the same fiber furnish at the specified pH levels containing respectively 200 parts by weight per million and 500 parts per million of sulfate ions based on the weight of the furnish and also 200 parts per million of sulfate ions based on the weight of the furnish conjunctively with 40 pounds of alum per ton of fiber on a dry basis.

The results of these tests are set forth below in tabular form.

| Polymer Additive | Milliters Canadian Standard Freeness | | | | | | |
|---|---|---|---|---|---|---|---|
| | Fiber Furnish, | | Fiber Furnish, plus 200 p.p.m. $SO_4^-$ | | Fiber Furnish, plus 500 p.p.m. $SO_4^-$ | | Fiber Furnish, plus alum, plus $SO_4^-$ |
| | pH4 | pH7 | pH4 | pH7 | pH4 | pH7 | pH4 |
| None (Control) | 142 | 161 | | | | | |
| Polymer of Invention | 587 | 486 | 556 | 430 | 537 | 430 | 507 |
| Polyamide | 282 | 284 | 258 | 279 | 236 | 270 | 260 |
| Cationic Starch | 172 | 191 | 181 | 216 | 181 | 170 | 213 |
| Polysulfonium | 302 | 279 | 274 | 284 | 250 | 281 | 260 |
| Acrylamide-aminoalkylacrylate Copolymer | 189 | 181 | 186 | 181 | 181 | 181 | 231 |
| PEI | 365 | 425 | 294 | 430 | 294 | 399 | 265 |

To illustrate the surprising benefits achieved according to the processing technology of the invention, a polymer as described above was prepared as follows. A polyacrylamide in which about 4 percent of the polymerized carboxamide groups had been hydrolyzed to sodium carboxylate groups was dissolved in water to provide a 0.291 weight percent solution of the polymer. This polymer was a flocculant grade polyacrylamide having a molecular weight of about 2 million. Additions were made to this polymer solution to provide a reaction system with sufficient formaldehyde and dimethylamine hydrochloride to stoichiometrically react with ½ the available carboxamide groups. The pH of the system was adjusted to about 10.5 and the solution allowed to react at room temperature for 3 hours. The polyacrylamide polymer had been converted, at that point, into essentially a terpolymer containing the original sodium carboxylate groups and about 50 percent of the original carboxamide groups, the nitrogen in remaining carboxamide groups having been substituted with dimethylaminomethyl groups.

A fiber furnish was obtained having 1 percent by weight fiber content consisting of 70 percent waste newsprint and 30 percent unbleached softwood kraft pulp, beaten to a freeness of about 300 ml. Canadian Standard Freeness.

Two 300 ml. aliquots of this furnish were diluted to 1000 ml. with water. The pH value of the two diluted aliquots were adjusted to 4.5 and 7.0, respectively, with HCl. To each sample was added a sufficient amount of the aforedescribed polymer solution to provide 0.15 percent of polymer based on the weight of dry fiber. Each polymer treated sample was then subjected to the Canadian Standard Freeness Test.

For the purposes of comparison, identical testing was carried out using the untreated fiber furnish at the different pH levels. Also tested were other fiber furnishes prepared in a like manner to that above containing identical amounts of different polymers known as drainage aid improvers. Included among the comparative polymers tested were a water soluble polyamide-epichloro-hydrin condensation product, available under the trademark Kymene 557 (Hercules Powder Co.), an amino starch available under the trademark Cato 8 (National Starch), a cationic acrylamide polymer believed to be a copolymer of acrylamide and an aminoalkyl acrylate available under the trademark Reten 205–M (Hercules Powder Co.), an experimental polysulfonium in the form of polyvinylbenzyl di-(2-hydroxyethyl) sulfonium chloride and a high molecular weight polyethylenimine (PEI).

The above data illustrates the unique activity of a polymer under the invention as a drainage aid, particularly under acidic conditions. At the acid pH level, the polymer is far superior to its closest competitor in the form of polyethyleneimine, both without and with the presence of sulfate ions.

In a like manner to the foregoing, similar improvement in the drainage rate of fiber furnish at acidic pH levels is achieved by substituting, for the polymer employed above, water soluble reaction products of formaldehyde and dimethyl amine or diethyl amine hydrochloride with a polymer such as polymethacrylamide, or copolymers of acrylamide with acrylic acid, methacrylic acid, alkali metal salts of the foregoing acids, sodium, styrene sulfonate, N-vinyl-pyrrolidone, N-vinyl-pyridine, 2-aminoethyl acrylate, and copolymers of acrylamide or methacrylamide with up to 50 mole percent of water insoluble monomers such as methyl acrylate, methyl methacrylate, acrylonitrile, styrene, vinyl methyl ether, vinyl acetate and the like.

A preferred embodiment of the invention involves the use in the described manner of a polyacrylamide having up to about 10 percent of the initially available carboxamide groups hydrolyzed to alkali metal, e.g., sodium, carboxylate, groups, which polyacrylamide has been reacted with sufficient formaldehyde and dialkylamine to convert from about 10 up to about 50 mole percent of the remaining carboxamide groups to a N-dialkylaminomethyl derivative. Such a polymer has been found to be superior in improving drainage rates.

What is claimed is:

1. In a method for manufacturing paper which comprises wet laying an acidic fiber furnish to form paper, the improvement which consists in incorporating into the furnish from about 0.01 up to about 0.3 percent by weight, based on the fiber content of the furnish, of a water soluble, essentially linear, higher molecular weight polymer corresponding to a vinyl polymerization product of monoethylenically unsaturated monomers in which at least about 5 mole percent of the combined mers is a monomer unit having the general formula:

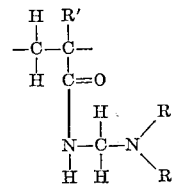

wherein R is an alkyl group having from 1 to 2 carbons and R' is selected from the group consisting of hydrogen and methyl, said polymer being characterized by a water solution viscosity, in which 0.5 percent by weight of the polymer is dissolved, of at least 12 centipoises as measured at pH 11 with an Ostwald viscosimeter at 25° C.

2. In a method for manufacturing paper which comprises wet laying an acidic fiber furnish having a pH from about 4 up to about 7 and containing at least about 200 parts per million by weight of sulfate ions to form paper, the improvement which consists in incorporating into the furnish from about 0.01 up to about 0.3 percent by weight, based on the fiber content of the furnish, of a water soluble, essentially linear, high molecular weight polymer corresponding to a vinyl polymerization product of monoethylenically unsaturated monomers in which at least about 5 mole percent of the combined mers is a monomer unit having the general formula:

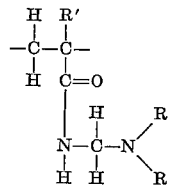

wherein R is an alkyl group having from 1 to 2 carbons and R' is selected from the group consisting of hydrogen and methyl, said polymer being characterized by a water solution viscosity, in which 0.5 percent by weight of the polymer is dissolved, of at least 12 centipoises as measured at pH 11 with an Ostwald viscosimeter at 25° C.

3. In a method for manufacturing paper which comprises wet laying an acidic fiber furnish to form paper, the improvement which consists in incorporating into the furnish from about 0.01 up to about 0.3 percent by weight, based on the fiber content of the furnish, of a water soluble, essentially linear, high molecular weight polymer obtained as the reaction product of a polyacrylamide, having up to about 10 percent of the initially available carboxamide group hydrolyzed to alkali metal carboxylate groups, with sufficient formaldehyde and dialkyl amine, wherein the alkyl groups contain from 1 to 2 carbons, to convert from about 10 up to about 50 mole percent of the remaining carboxamide groups to the corresponding N-dialkylaminomethyl substituted amides said polymer having a water solution viscosity, in which 0.5 percent by weight polymer is dissolved, of at least about 12 centipoises as measured at pH 11 with an Ostwald viscosimeter at 25° C.

References Cited
UNITED STATES PATENTS 2,328,901  9/1943  Grimm et al. _____ 260—72
2,884,057  4/1959  Wilson et al. _____ 260—89.7

S. LEON BASHORE, *Primary Examiner.*